US011508405B1

United States Patent
Tang

(12) United States Patent
(10) Patent No.: US 11,508,405 B1
(45) Date of Patent: Nov. 22, 2022

(54) MAGNETIC RECORDING MEDIA WITH PLASMA-POLISHED PRE-SEED LAYER OR SUBSTRATE

(71) Applicant: Western Digital Technologies, Inc., San Jose, CA (US)

(72) Inventor: Kai Tang, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/353,456

(22) Filed: Jun. 21, 2021

(51) Int. Cl.
*G11B 5/82* (2006.01)
*G11B 5/667* (2006.01)
*G11B 5/012* (2006.01)
*G11B 5/706* (2006.01)

(52) U.S. Cl.
CPC ............. *G11B 5/667* (2013.01); *G11B 5/012* (2013.01); *G11B 5/70615* (2013.01); *G11B 5/70621* (2013.01)

(58) Field of Classification Search
CPC .................................. G11B 5/72; G11B 5/82
USPC .................................................. 360/48, 135
See application file for complete search history.

(56) References Cited

U.S. PATENT DOCUMENTS

| | | | |
|---|---|---|---|
| 6,095,160 A | 8/2000 | Chu | |
| 6,221,118 B1 | 4/2001 | Yoshida et al. | |
| 7,087,290 B2 | 8/2006 | Feist et al. | |
| 8,029,651 B2 * | 10/2011 | Tanaka | G11B 5/72 360/48 |
| 8,414,967 B2 * | 4/2013 | Fukushima et al. | G11B 5/82 360/48 |
| 9,159,353 B2 | 10/2015 | Mercado et al. | |
| 9,940,963 B1 | 4/2018 | Tang | |
| 10,777,222 B1 | 9/2020 | Liu et al. | |
| 10,923,150 B2 | 2/2021 | Moriya et al. | |

(Continued)

FOREIGN PATENT DOCUMENTS

JP 9-115865 * 5/1997 ............... G11B 5/72

OTHER PUBLICATIONS

Dwivedi, Neeraj et al., "Understanding the Role of Nitrogen in Plasma-Assisted Surface Modification of Magnetic Recording Media with and without Ultrathin Carbon Overcoats"; Scientific Reports; Jan. 14, 2015; https://www.nature.com/articles/srep07772; 13 pages.

(Continued)

*Primary Examiner* — Nabil Z Hindi
(74) *Attorney, Agent, or Firm* — Loza & Loza, LLP; Gabriel Fitch

(57) ABSTRACT

Magnetic recording media including a soft magnetic underlayer (SUL) formed over a plasma-polished substrate or pre-seed layer. In some examples, the substrate or pre-seed layer is plasma-polished using an inert gas such as krypton so that the roughness of the surface on which the SUL is deposited is reduced. The roughness reduction can lead to improved crystallographic texture within subsequently deposited media films, and consequently, to increased recording performance of the media. In particular, media signal-to-noise ratio (SNR), linear recording density, and areal recording density or areal density capacity (ADC) can be improved. In one aspect, a carbon deposition/etching apparatus may be modified to polish the substrate or pre-seed layer with krypton or other inert gases, rather than be used to deposit carbon overcoat.

24 Claims, 10 Drawing Sheets

(56) References Cited

U.S. PATENT DOCUMENTS

| | | | |
|---|---|---|---|
| 2002/0058159 A1 | 5/2002 | Kubota et al. | |
| 2004/0142640 A1 | 7/2004 | Prabhu et al. | |
| 2012/0196033 A1 | 8/2012 | Sakai et al. | |
| 2013/0309526 A1 | 11/2013 | Mercado et al. | |
| 2015/0302877 A1* | 10/2015 | Tang ................... | H01J 37/3244 216/22 |
| 2021/0151076 A1 | 5/2021 | Tang | |

OTHER PUBLICATIONS

International Search Report and Written Opinion for International Application No. PCT/US2022/016472, dated May 17, 2022, 11 pages.

Gerhard, C. et al., "Polishing of optical media by dielectric barrier discharge inert gas plasma at atmospheric pressure", Journal of the European Optical Society—Rapid Publications; vol. 8; Dec. 31, 2013; https://www.jeos.org/index.php/jeos_rp/article/view/13081; 5 pages.

Sarkar, Jaydeep, "Sputtering Targets and Sputtered Films for the Microelectronic Industry", Sputtering Materials for VLSI and Thin Film Devices; Dec. 31, 2014; https://www.researchgate.net/publication/285193187_Sputtering_Targets_and_Sputtered_Films_for_the_Microelectronic_Industry; 1 page; Abstract Only.

* cited by examiner

600

602

Deposition apparatus configured for depositing, onto a substrate, a pre-seed layer, an SUL, one or more intermediate layers and a magnetic recording layer structure

606

Inert Gas Source (e.g. Krypton gas)

604

Polishing apparatus that includes a modified carbon etching/deposition apparatus configured without a carbon source so as to generate an inert gas plasma (without carbon particles) for polishing a substrate or pre-seed layer

FIG. 7

MAGNETIC RECORDING MEDIA WITH PLASMA-POLISHED PRE-SEED LAYER OR SUBSTRATE

FIELD

Aspects of the present disclosure relate to magnetic recording media, and more specifically to magnetic recording media with substrates, pre-seed layers, and soft magnetic underlayers (SULs).

INTRODUCTION

Increasing the recording density of hard disk drives (HDDs) is becoming ever more challenging. Herein, techniques are presented for improving media signal-to-noise ratio (SNR), linear recording density, and areal recording density or areal density capacity (ADC) within magnetetic recording media of HDDs, especially for use in magnetic recording media structures that include a soft magnetic underlayer (SUL) formed over a substrate or a pre-seed layer.

SUMMARY

One aspect of the present disclosure provides a magnetic recording medium that includes: a base structure comprising a surface that includes an inert gas plasma-polish residue; a soft magnetic underlayer (SUL) on the surface of the base structure; and at least one magnetic recording layer on the SUL.

Another aspect of the present disclosure provides a method for fabricating a magnetic recording medium. The method includes: providing a base structure; plasma-polishing a surface of the base structure using an inert gas; providing an SUL on the plasma-polished surface of the base structure; and providing at least one magnetic recording layer on the SUL.

Yet another aspect of the present disclosure provides a magnetic recording medium that includes: a substrate; a pre-seed layer on the substrate, wherein the pre-seed layer is plasma-polished; an SUL on the plasma-polished pre-seed layer; and at least one magnetic recording layer on the SUL.

BRIEF DESCRIPTION OF THE DRAWINGS

FIG. 7 is a block diagram of a system including an apparatus for polishing a substrate or pre-seed layer using an inert gas and an apparatus for depositing an SUL and other layers on the plasma-polished substrate or pre-seed layer in accordance with an embodiment of the disclosure.

DETAILED DESCRIPTION

Figure 1:
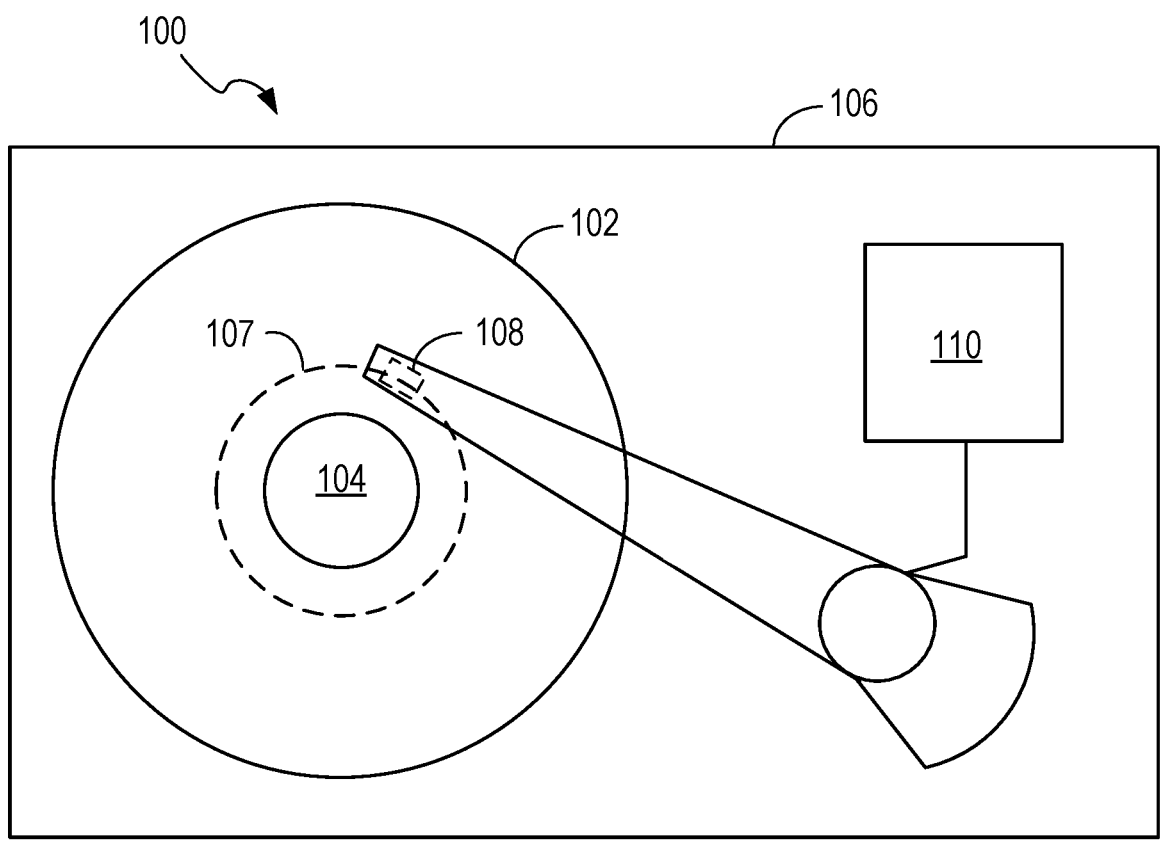
FIG. 1 is a top schematic view of a disk drive configured for magnetic recording and including a magnetic recording medium with a soft magnetic underlayer (SUL) on a plasma-polished substrate or pre-seed layer in accordance with an embodiment of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Substrates are used for hard disk drive (HDD) media. In general, the substrates can be categorized as electrically conductive (e.g., NiP-plated Al) or non-electrically-conductive (e.g., glass or ceramic). For non-conducting substrates, a pre-seed layer may be deposited to provide a suitable electrical connection so that electrical bias can be applied during subsequent film deposition (e.g., one of more films from and including the SUL through and including the overcoat). A pre-seed layer may include a relatively thick metal layer in order to provide low resistance. Deposition of such a thick pre-seed layer is often accompanied by an increase in surface roughness (e.g., at a top surface of the pre-seed layer), which can lead to poor crystallographic texture of the media, and consequently, poor signal-to-noise ratio (SNR) and poor recording performance.

Often during design of HDD media a compromise must be made between conductivity and crystallographic texture. For example, a minimum pre-seed layer thickness is selected based on a requirement that a sufficient electrical conductivity can be provided for application of bias voltage to the substrate during deposition of subsequent films. Such a pre-seed thickness is typically around 29 to 59 nanometers (nm), which results in roughness (e.g., arithmetic average roughness) of around 3.8 angstroms (Å) at the surface after the pre-seed layer is deposited. Media films grown on top of such a rough surface may have poor crystallographic texture with X-ray rocking angles of around 3.4° and 3.6°, respectively, for Ru (0004) and Mag (0004) peaks.

Herein, methods and media are described wherein the surface of a substrate or a pre-seed layer is plasma-polished so that the roughness of the surface on which a soft magnetic underlayer (SUL) is deposited can be reduced. The roughness reduction can lead to improved crystallographic texture of subsequently deposited media films, and consequently, to increased recording performance of the media. In particular, media SNR, linear recording density, and areal recording density or areal density capacity (ADC) can be improved. Polishing may also serve to reduce head-to-media spacing (HMS). In some examples, a pre-seed layer is formed over a non-conductive substrate and the pre-seed layer is polished before the SUL is formed on the pre-seed layer. In other examples, the SUL is formed directly on a substrate, which is plasma-polished before the SUL is applied. For conductive substrates, plasma-polishing can improve process control (e.g., improve heat handling during deposition of subsequent layers and help prevent corrosion of the substrate).

Co-pending U.S. patent application Ser. No. 17/353,472, filed contemporaneously herewith, entitled "MAGNETIC RECORDING MEDIA WITH OXIDIZED PRE-SEED LAYER," and assigned to the assignee of the present application, is fully incorporated by reference herein for all purposes, and it should be understood that various features and inventions of the present application and the co-pending application can be practiced together. By way of example and not limitation, a magnetic recording medium may be provided that includes a pre-seed layer that is oxidized and plasma-polished.

Disk Drive with Magnetic Recording Media

FIG. 1 is a top schematic view of a disk drive 100 configured for magnetic recording and including a magnetic recording medium 102 having an oxidized pre-seed layer in accordance with one embodiment of the disclosure. In illustrative examples, the magnetic recording medium 102 includes a perpendicular magnetic recording (PMR) medium. However, other recording media, such shingle-written magnetic recording (SMR) media, microwave assisted magnetic recording (MAMR) media or heat assisted magnetic recording (HAMR) may be used in other examples. Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, recording head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 2:
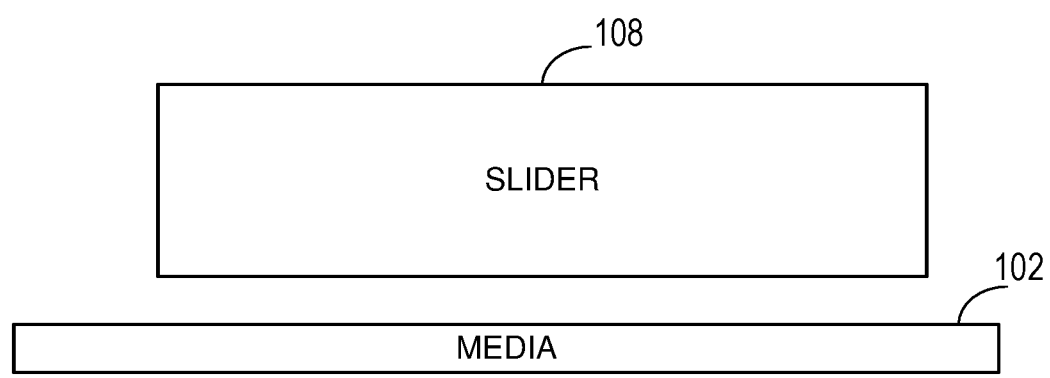
FIG. 2 is a side cross sectional schematic view of selected components of the magnetic recording system of FIG. 1 including a magnetic recording medium with the SUL on the plasma-polished substrate or pre-seed layer in accordance with an embodiment of the disclosure.

FIG. 2 is a side cross sectional schematic view of selected components of the magnetic recording system of FIG. 1 including the magnetic recording medium 102 with the plasma-polished substrate or pre-seed layer in accordance with an embodiment of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media with the plasma-polished substrates or pre-seed layers disclosed herein can be used in any suitable magnetic recording systems (e.g., such as PMR, SMR, HAMR, MAMR, and tape recording systems). For example, the magnetic recording media of various embodiments disclosed herein may be flexible media in the form a magnetic tape used in a tape-based data storage drive/system. For simplicity of description the various embodiments are primarily described in the context of an example HDD magnetic recording system. Illustrative examples where the substrate is polished are described next, and then examples where a pre-seed layer is polished are described.

Magnetic Recording Media with Plasma-Polished Substrate

Figure 3:
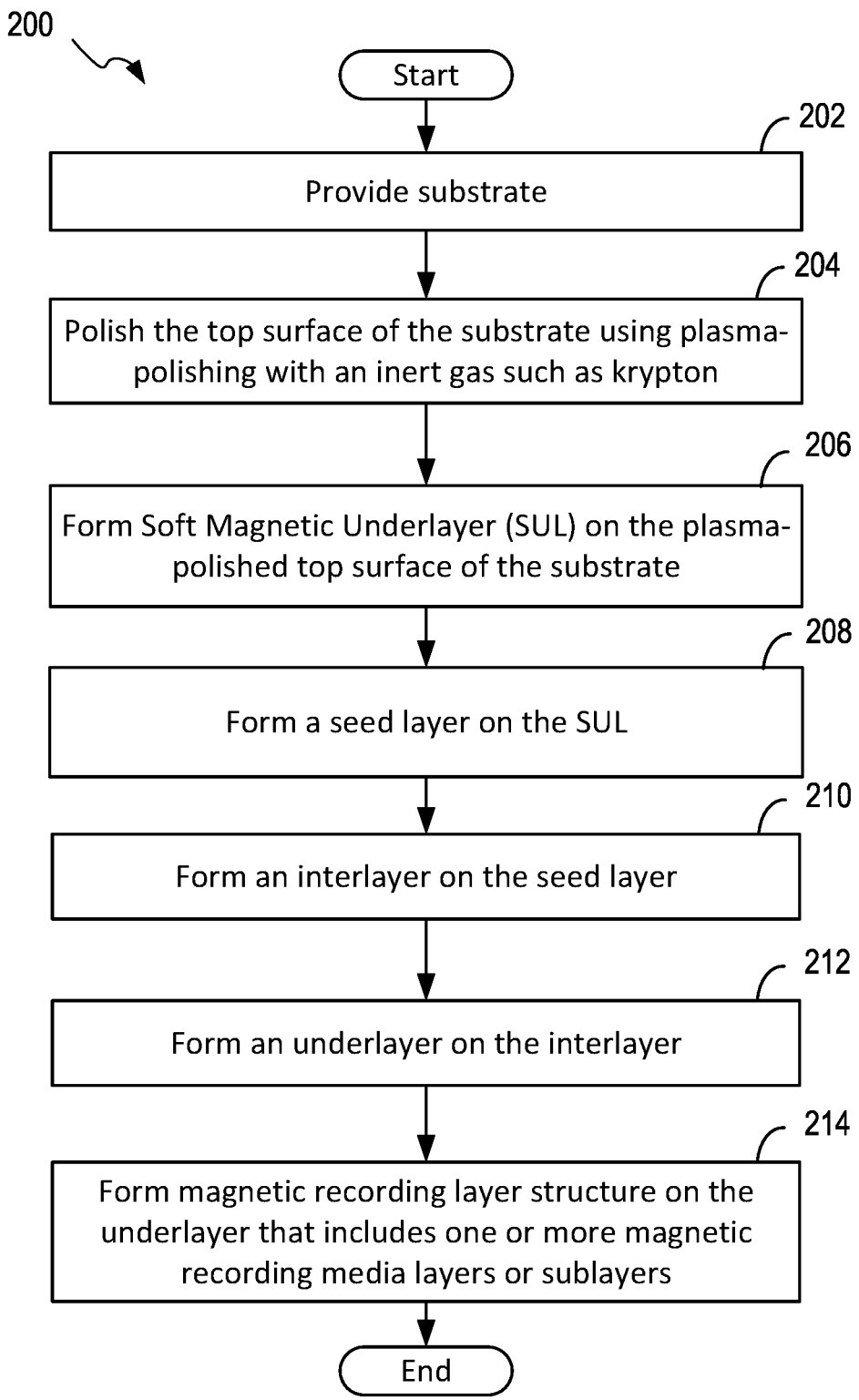
FIG. 3 is a flowchart of a process for fabricating a magnetic recording medium including an SUL on a plasma-polished substrate in accordance with an embodiment of the disclosure.

FIG. 3 is a flowchart of a process 200 for fabricating a magnetic recording medium including a plasma-polished substrate. In particular embodiments, the process 200 can be used to fabricate the magnetic recording medium 102 of FIGS. 1 and 2.

At block 202, the process provides a substrate. In at least some examples, the substrate is conductive, such as an Al alloy or NiP plated Al. In other examples, the substrate may be non-conductive. If non-conductive, a conductive pre-seed layer may be applied, as described below in connection with FIGS. 5-6. In some examples, the substrate has a diameter of about 97 millimeters or less. In other embodiments, the diameter may vary.

At block 204, the top surface of the substrate is plasma-polished using, e.g., an inert gas such as krypton, argon, xenon, neon, or combinations thereof. By way of example, the substrate may be placed inside a New Carbon Technology (NCT) station of the type provided by, for example, Intevac, Inc. However, rather than using the NCT station to apply a carbon overcoat to the substrate, the NCT station is instead used to plasma-polish the surface of the substrate using krypton or other suitable elements or compounds, e.g., other inert gases. For example, an inert gas may be injected into the NCT station and a plasma ignited. The NCT station thus strikes the surface of the substrate with the inert gas atoms and ions (rather than striking the substrate with carbon atoms). The inert gas plasma serves to polish the surface of the substrate. In some examples, the surface of the substrate is polished to have a roughness (e.g., an arithmetic average roughness) less that a selected threshold, such as less than 3.0 Å. Other parameters may be used for quantifying roughness or smoothness, such as maximum valley depth below a mean line or maximum peak height above a mean line as well as root mean square roughness.

In some examples, the entire top surface of the substrate is polished (or at least that portion of the top surface upon which an SUL will be deposited). Note that, following the polishing process, the top surface of the substrate will have at least some of the krypton or other inert gas atoms embedded therein. Moreover, in some examples, the top portion of the substrate exhibits a gradient in the percentage of embedded inert gas atoms, with the percentage decreasing with increasing distance from the top surface of the substrate (i.e., with the percentage decreasing with increasing depth into the substrate).

At block 206, an amorphous SUL is formed on the plasma-polished top surface of the substrate. It is believed that by plasma-polishing the top surface of the substrate, the SUL thus has improved properties (such as smoothness, etc.), which in turn provide for improved crystallographic structure in layers formed atop the SUL. The SUL can be made of one or more materials, such as cobalt, iron, molybdenum, tantalum, niobium, boron, chromium, or other soft magnetic material, or combinations thereof. In one aspect, the SUL may include two soft magnetic underlayers separated by an anti-ferromagnetic coupling (AFC) layer, such as ruthenium (Ru) or other AFC material. The SUL may be configured to support magnetization of magnetic recording media (discussed below) during data storage operations. More specifically, the SUL may be configured to provide a return path for a magnetic field applied during a write operation.

At block 208, a seed layer is formed on the SUL. The seed layer can be made of one or more materials, such as those containing elements of Ni, W, Fe, Cr, Al, combinations thereof, and/or other suitable materials known in the art. In one aspect, the SUL and seed layer are deposited at an ambient room temperature (e.g., without applying heat prior to or during deposition). At block 210, an interlayer is formed on the seed layer. At 212, an underlayer is formed on the interlayer. The interlayer and the underlayer may be referred to as intermediate layers. The one or more intermediate layers can be made of one or more materials, such as those containing elements of Co, Cr, Ru, and/or other suitable materials known in the art. In one example, the seed layer may be made of Ni, Fe, W, and Al, the interlayer may be made of Co, Cr, and Ru, and the underlayer may be made of Ru.

At block 214, a magnetic recording layer structure is formed on the interlayer with the magnetic recording layer structure including one or more magnetic recording media layers or sublayers. The magnetic recording media layers or sublayers may alternate with non-magnetic exchange control layers within the magnetic recording layer structure. The magnetic recording sublayers can be made of one or more magnetic materials, such as CoPt and/or CoCrPt, or other magnetic materials suitable for storing information magnetically. In some examples, the magnetic recording sublayers are made of a cobalt alloy including platinum. One or more of the magnetic recording sublayers may further include one or more additional materials, such as those containing elements of Cr, B, Ru, and/or combinations thereof. In one aspect, each of the magnetic recording sublayers includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, CoO, $Co_3O_4$, and/or combinations thereof. In some examples, a top magnetic recording sublayer may include at least the oxide segregant of $TiO_2$. The non-magnetic exchange control sublayers can be made of one or more materials, such as CoRu and/or CoRuCr with an oxide segregant, such as $TiO_2$, or other suitable non-magnetic material. In one aspect, the magnetic recording layer structure may be deposited at a temperature of about 150 degrees Celsius, or a temperature in the range from 50 to 340 degrees Celsius.

In one embodiment, the magnetic recording layer structure may also include a capping layer. In such case, the capping layer can be made of one or more materials such as Co, Pt, Cr, B, combinations thereof, and/or other suitable materials known in the art. Still further, an overcoat may be formed on a top surface of the magnetic recording layer structure, such as a carbon overcoat. In one embodiment, a lubricant layer may be applied on top of the overcoat. In such case, the lubricant layer can be made of one or more materials such as a polymer based lubricant and/or other suitable materials known in the art.

Note that FIG. 3 provides an illustrative example of a process for fabricating a magnetic recording medium including a plasma-polished substrate. In other examples, more or fewer processing stages may be employed.

In one embodiment, the process can perform the sequence of actions in a different order (although the plasma-polishing of the substrate should precede the deposition of the SUL and the layers above the SUL to provide the aforementioned improved crystallographic structure). In another embodiment, the process can skip one or more of the other actions. In other embodiments, one or more actions are performed simultaneously. In some embodiments, additional actions can be performed. For example, in one aspect, the process may include any additional actions needed to fabricate the magnetic recording layer structure of the media.

In several embodiments, the forming or deposition of the various layers or sublayers can be performed using a variety of deposition sub-processes, including, but not limited to physical vapor deposition (PVD), direct current (DC) magnetron sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Figure 4:
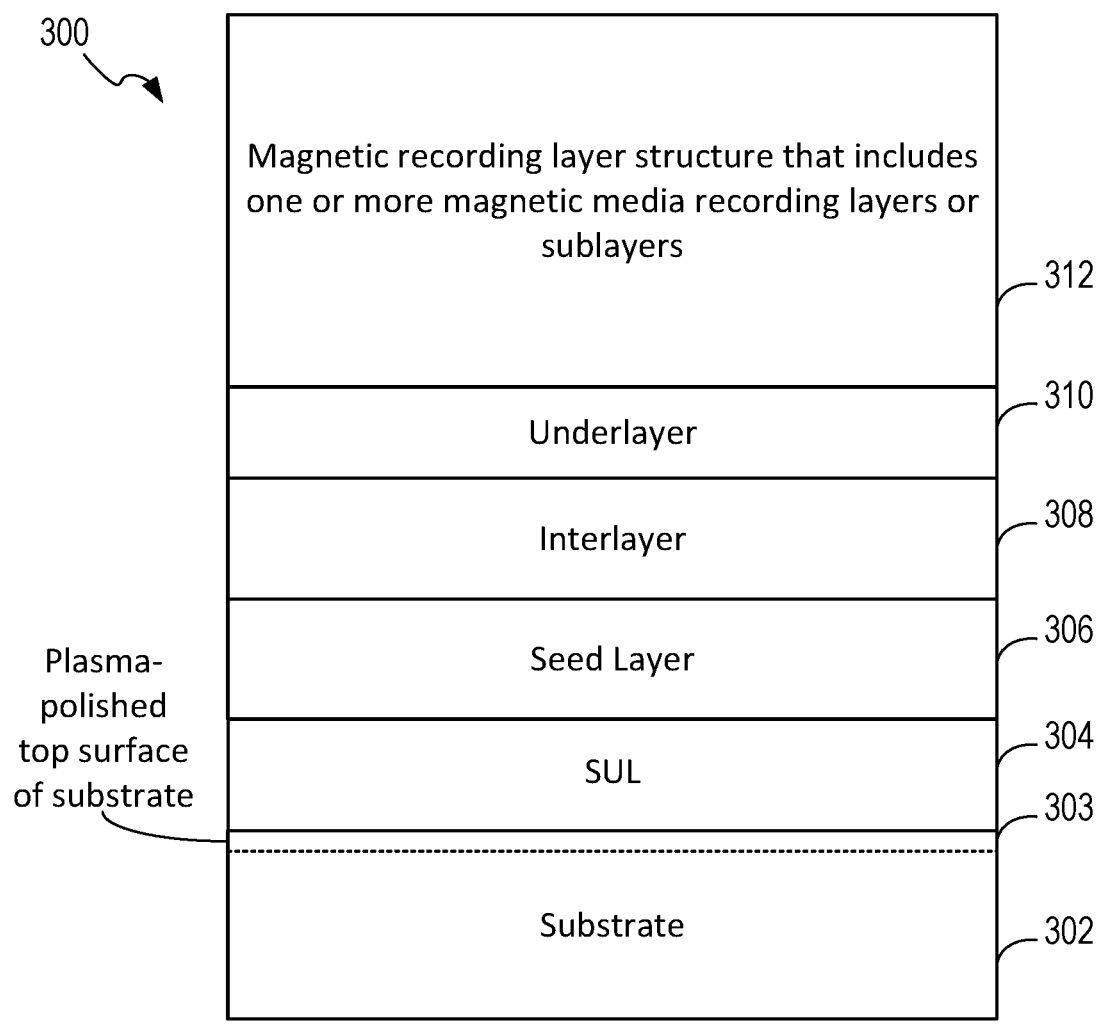
FIG. 4 is a side cross sectional view of a magnetic recording medium having an SUL on a plasma-polished substrate in accordance with an embodiment of the disclosure.

FIG. 4 is a side cross sectional view of a magnetic recording medium 300, which may be fabricated using the process of FIG. 3 or other suitable processes. In particular embodiments, the magnetic recording medium 300 can be used in conjunction with the disk drive 100 of FIGS. 1 and 2, or a magnetic tape drive. In sequence from the bottom, the medium 300 includes a substrate 302 having a plasma-polished top surface portion 303, an SUL 304, a seed layer 306, an interlayer 308, an underlayer 310, and a magnetic recording layer structure 312 that includes one or more media layers or sublayers. As already explained above, the magnetic recording layers or sublayers may alternate with exchange control layers within magnetic recording structure. As also explained above, more or fewer layers may be provided within the medium 300, such as an additional overcoat on the magnetic recording layer structure 312, or omission of the underlayer 310 or interlayer 308.

The various layers and sublayers may be formed to have the exemplary constituents or component materials described above in connection with FIG. 3. As explained, following the polishing process, the top surface portion 303 of the substrate 302 will have at least some of the krypton atoms (or other inert gas atoms used during plasma polishing) embedded therein.

Magnetic Recording Media with Plasma-Polished Pre-Seed Layer

Figure 5:
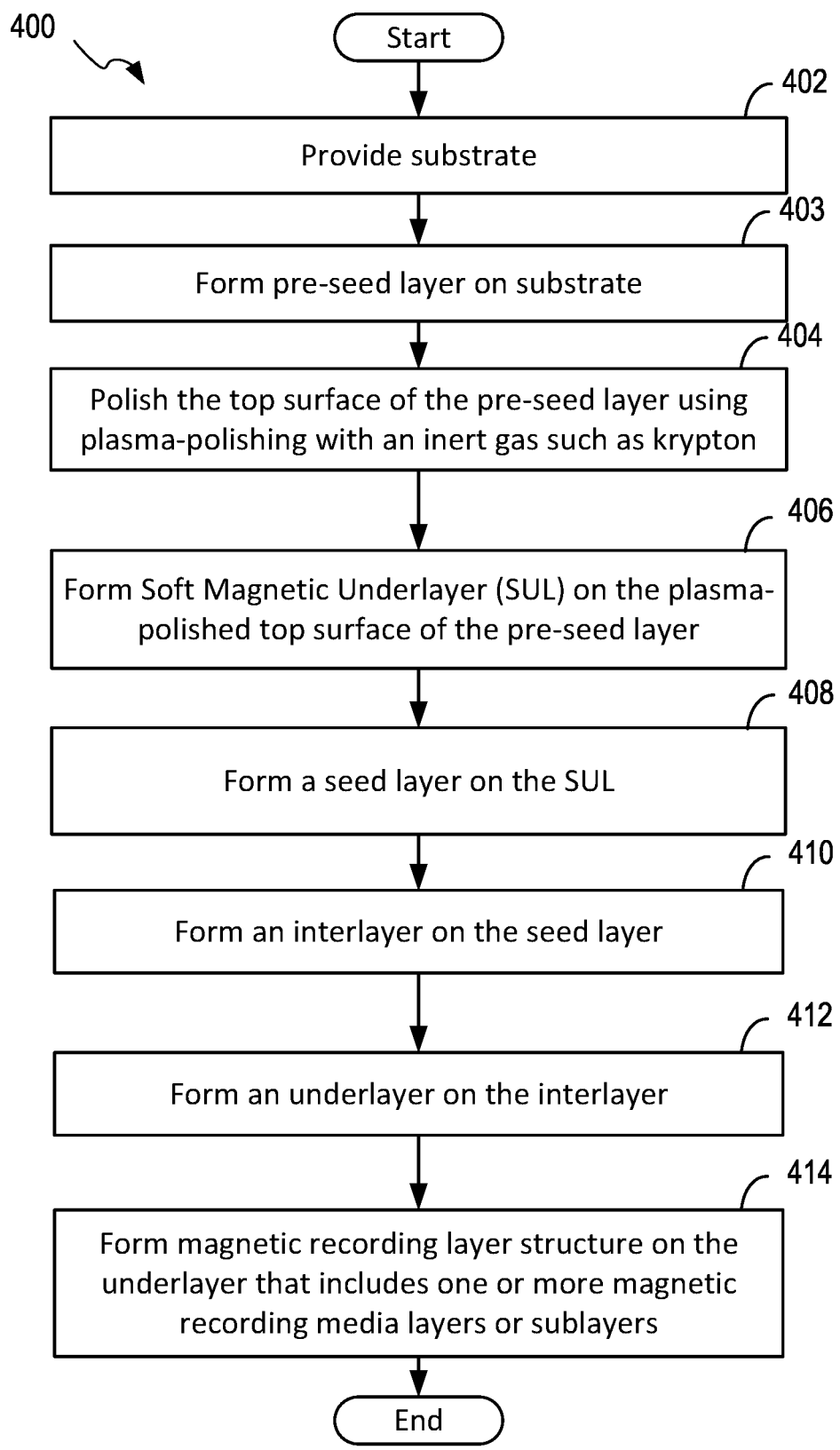
FIG. 5 is a flowchart of a process for fabricating a magnetic recording medium including an SUL on a plasma-polished pre-seed layer in accordance with an embodiment of the disclosure.

FIG. 5 is a flowchart of a process 400 for fabricating a magnetic recording medium including a plasma-polished pre-seed layer. In particular embodiments, the process 400 can be used to fabricate the magnetic recording medium 102 of FIGS. 1 and 2.

At block 402, the process provides a substrate. In at least some examples, the substrate is made of one or more non-conductive materials such glass, glass ceramic, and/or combinations thereof. In one or more embodiments for magnetic tape recording applications, the substrate can include a flexible material, such a film made of one of various types of resins, polyesters, polyolefins, polyamides, and the like, or combinations thereof. The substrate may include non-magnetic materials, and may be laminated. In this examples, since the substrate is non-conductive, a conductive pre-seed layer (discussed below) may be added. (In other examples, as discussed above in connection with FIGS. 3-4, the substrate may be conductive.) In some examples, the substrate has a diameter of about 97 millimeters or less. In other embodiments, the diameter may vary.

At block 403, a pre-seed layer is formed on the substrate. In some examples, the pre-seed layer is formed of CrTi or NiTa, or combinations thereof. The pre-seed layer may be amorphous or crystalline. Note that some media have an adhesion layer formed over a substrate. The pre-seed layer has a different function than an adhesion layer. As noted above, the pre-seed layer is formed on a non-conducting substrate to provide a suitable electrical connection so that electrical bias can be applied during film deposition of the media. An adhesion layer is used in some media to reduce delamination of layers or films deposited over the adhesion layer. In some examples, the pre-seed layer and adhesion layer can be separate layers. In other examples, the pre-seed layer and adhesion layer can be combined into one layer that can provide both good electric conductance and good adhesion simultaneously.

At block 404, the top surface of the pre-seed layer is plasma-polished using, e.g., an inert gas such as krypton. By way of example, the substrate with the pre-seed layer may be placed inside an NCT station of the type noted above, which is used to plasma-polish the pre-seed layer using krypton or other suitable elements or compounds, e.g., other inert gases. The NCT station strikes the pre-seed layer with the inert gas atoms and ions, which serve to polish the surface of the pre-seed layer. In some examples, the surface of the pre-seed layer is polished to have a smoothness less that a selected threshold, such as less than 3 Å. In other examples, the surface of the pre-seed layer is polished to have an X-ray rocking angle less that a selected threshold, such an Ru (0004) rocking angle less than 3.25° or a Mag (0004) rocking angle less than 3.5°.

In some examples, the entire top surface of the pre-seed layer is polished (or at least that portion of the top surface upon which an SUL will be deposited). Note that, following the polishing process, the top surface of the pre-seed layer has at least some of the krypton or other inert gas atoms embedded therein. Moreover, in some examples, the top portion of the pre-seed layer exhibits a gradient in the percentage of embedded inert gas atoms, with the percentage decreasing with increasing distance from the top surface of the pre-seed layer (i.e., with the percentage decreasing with increasing depth into the pre-seed layer).

At block 406, an amorphous and relatively thick SUL is formed on the plasma-polished top surface of the pre-seed layer. It is believed that by plasma-polishing the top surface of the pre-seed layer, the SUL thus has improved properties (such as smoothness, etc.), which in turn provide for improved crystallographic structure in layers formed atop the SUL. At block 408, a seed layer is formed on the SUL. In one aspect, the SUL and seed layer are deposited at an ambient room temperature (e.g., without applying heat prior to or during deposition). At block 410, an interlayer is formed on the seed layer. At 412, an underlayer is formed on the interlayer. The interlayer and the underlayer may be referred to as intermediate layers. At block 414, a magnetic recording layer structure is formed on the interlayer with the magnetic recording layer structure including one or more magnetic recording media layers or sublayers. The magnetic recording media layers or sublayers may alternate with non-magnetic exchange control layers within the magnetic recording layer structure. In one aspect, the magnetic recording layer structure may be deposited at a temperature of about 150 degrees Celsius, or a temperature in the range from 50 to 540 degrees Celsius. In one embodiment, the magnetic recording layer structure may also include a capping layer. In one embodiment, a lubricant layer may be applied on top of the overcoat. Suitable materials for use in the SUL, seed layer, interlayer, underlayer, magnetic recording layer structure, capping layer, and lubricant layer are described above.

Note that FIG. 5 provides an illustrative example of a process for fabricating a magnetic recording medium including a plasma-polished pre-seed layer. In other examples, more or fewer processing stages may be employed. In one embodiment, the process can perform the sequence of actions in a different order (although the plasma-polishing of the pre-seed layer should precede the deposition of the SUL and the layers above the SUL to provide the aforementioned improved crystallographic structure). In other embodiments, the process can skip one or more of the other actions. In still other embodiments, one or more actions are performed simultaneously. In some embodiments, additional actions can be performed. For example, in one aspect, the process may include any additional actions needed to fabricate the magnetic recording layer structure of the media.

In several embodiments, the forming or deposition of the various layers or sublayers can be performed using a variety of deposition sub-processes, including, but not limited to PVD, DC magnetron sputter deposition, ion beam deposition, radio frequency sputter deposition, or CVD, including PECVD, LPCVD and ALCVD. In other embodiments, other suitable deposition techniques known in the art may also be used.

Figure 6:
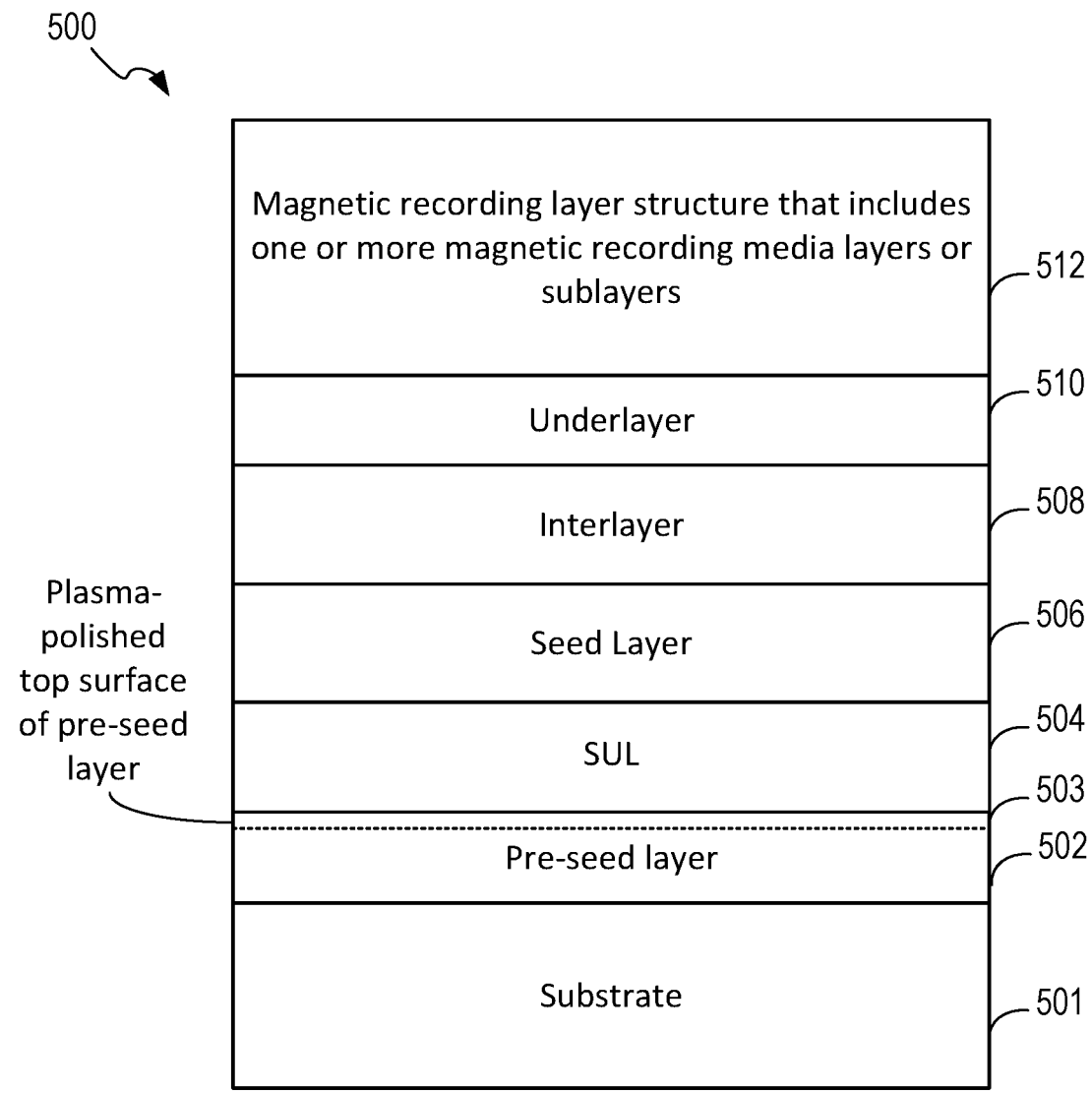
FIG. 6 is a side cross sectional view of a magnetic recording medium including an SUL on a plasma-polished pre-seed layer in accordance with an embodiment of the disclosure.

FIG. 6 is a side cross sectional view of a magnetic recording medium 500, which may be fabricated using the process of FIG. 5 or other suitable processes. In particular embodiments, the magnetic recording medium 500 can be used in conjunction with the disk drive 100 of FIGS. 1 and 2, or a magnetic tape drive. In sequence from the bottom, the medium 500 includes a substrate 501, a pre-seed layer 502 having a plasma-polished top surface portion 503, an SUL 504, a seed layer 506, an interlayer 508, an underlayer 510, and a magnetic recording layer structure 512 that includes one or more media layers or sublayers. As already explained, the magnetic recording layers or sublayers may alternate with exchange control layers within magnetic recording structure. As also explained, more or fewer layers may be provided within the medium 500, such as an additional overcoat on the magnetic recording layer structure 512, or omission of the underlayer 510 or interlayer 508.

The various layers and sublayers may be formed to have the exemplary constituents or component materials described above. As explained, following the polishing process, the top surface portion 503 of the pre-seed layer 502 will have at least some of the krypton atoms (or other inert gas atoms used during plasma polishing) embedded therein.

Insofar as roughness is concerned, in some examples, without polishing the pre-seed layer, a surface roughness of the pre-seed layer was found to be 3.8 Å. With polishing, the roughness was reduced to 2.64 Å or 2.52 Å, depending upon the amount of polishing. Insofar as X-ray rocking angle is concerned, in some examples, without polishing the pre-seed layer, the Ru (0004) rocking angle was found to be 3.41° and the Mag (0004) rocking angle was found 3.61°. With polishing, the Ru (0004) rocking angle was reduced to be 3.14° or 3.05° and the Mag (0004) rocking angle was reduced to 3.37° or 3.28°, depending upon the amount of polishing.

Polishing/Deposition System

FIG. 7 illustrates an overall system 600 that may be used to deposit various layers on a substrate to form a magnetic recording medium and to selectively polish the substrate (if no pre-seed layer is deposited) or to polish the pre-seed layer (if one is provided). Briefly, the system 600 includes a deposition apparatus 602 configured for depositing, onto a substrate, a pre-seed layer, an SUL, one or more intermediate layers, and a magnetic recording layer structure. The deposition apparatus may be, for example, configured to perform one or more of: PVD, DC magnetron sputter deposition, ion beam deposition, radio frequency sputter deposition, or CVD, including PECVD, LPCVD, and ALCVD. The deposition apparatus 602 may include one or more individual apparatus stations, components, or systems for depositing different layers.

The system 600 also includes a polishing apparatus 604 that includes or consists of a modified carbon etching/deposition apparatus configured without a carbon source so as to generate an inert gas plasma (without carbon particles) for polishing a substrate or pre-seed layer (or other structure or layer). In this regard, a carbon etching/deposition apparatus ordinarily includes a cathode (with a source of carbon material), an anode, and a plasma generation system within a sealed chamber. These components are configured and controlled so that, in use, carbon particles are emitted from the cathode and travel within the ignited plasma in the chamber and accelerate toward the anode, upon which a structure to be coated or etched is positioned (such as a substrate). The carbon particles strike (or bombard or impinge upon) the structure and deposit a carbon coating onto the target structure or, if the apparatus is so configured, leave an etched pattern. Magnetic containment components may be provided to contain the plasma and guide the carbon particles in a controlled manner within the chamber.

The polishing apparatus 604 may be a modified version of such an apparatus, which is modified to omit the carbon source from the cathode and to inject an inert gas into its chamber using an inert gas source 606 (such as a source of krypton gas) for use in polishing a structure (such as a substrate). In use, when the plasma is ignited, the inert gas atoms and ions are accelerated toward the structure to be polished, which may be adjacent to the anode. The inert gas atoms and ions strike (or bombard or impinge upon) the structure and thereby polish the structure by knocking off (or otherwise dislodging) atoms, particles, or other material from the surface of the structure, such as atoms, particles or material that juts out from the surface (and hence contributes to a rough surface). The bias voltage between the plasma generating source and substrate and/or the voltage between the anode and cathode can be controlled to select or adjust the amount of polishing to be performed to achieve a desired smoothness or roughness, such as a surface smoothness or roughness below of predetermined smoothness or roughness threshold. For example, a higher magnitude bias voltage and/or voltage may be used to perform a "strong" polish, whereas a lower magnitude bias voltage and/or voltage may be used to perform a "mid-level" polish. Additionally or alternatively, the amount of time the polish is applied can be adjusted to control the amount of polishing, or the plasma density can be adjusted to control the amount of polishing. In one example, the polishing apparatus is a modified version of the aforementioned NCT station. When using the modified NCT station, the strong polish was achieved using a disk bias voltage of −150V while the mid polish used a disk bias voltage of −100V. Note that an NCT station does not ordinarily have or use a target. Alternatively, a DC magnetron (which uses a target) may be used to polish the structure (although, with a DC magnetron some unwanted particles or materials from the target may be deposited on the structure being polished). RF sputter station or other plasma systems may be used as well, as long as they can be adapted to smooth the surface.

With the system of FIG. 7, the method of FIG. 3 may be performed to fabricate the medium of FIG. 4 by first inserting the substrate into the polishing apparatus 604 and controlling the polishing apparatus 604 to polish the substrate to a desired smoothness. The substrate is then transferred to the deposition apparatus 602 to deposit the SUL, one or more intermediate layers, and the magnetic recording layer structure. The method of FIG. 5 may be performed to fabricate the medium of FIG. 6 by first inserting the substrate into the deposition apparatus 602 to deposit the pre-seed layer on the substrate. The substrate (with pre-seed layer) is transferred to the polishing apparatus 604, which is controlled to polish the pre-seed layer to a desired smoothness. The substrate (with the smoothed pre-seed layer) is then transferred back to the deposition apparatus 602 to deposit the SUL, one or more intermediate layers, and the magnetic recording layer structure. In other examples, if the deposition apparatus is suitably-equipped, the polishing may be performed within the same deposition apparatus that deposits the pre-seed layer, SUL and other layers.

Additional Methods and Apparatus

Figure 8:
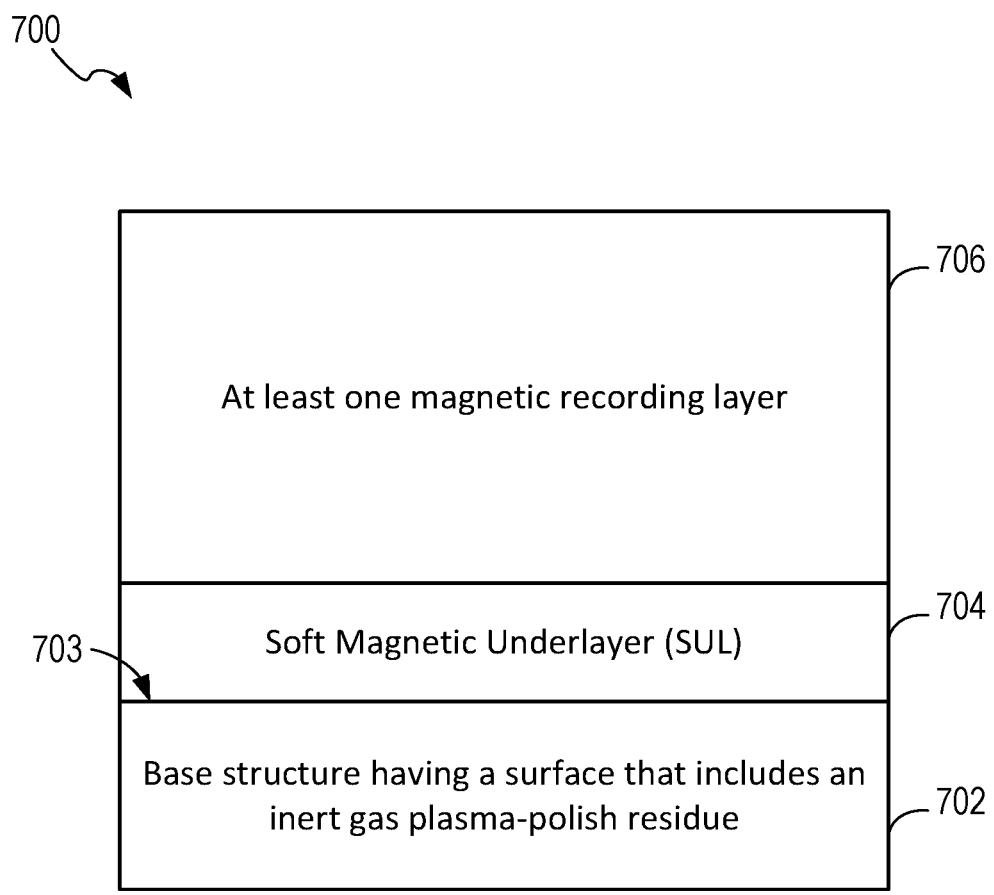
FIG. 8 is a side cross sectional view of a magnetic recording medium having an SUL on a base structure (e.g., a substrate or substrate and pre-seed layer), wherein a surface of the base structure has an inert gas plasma-polish residue in accordance with an embodiment of the disclosure.

FIG. 8 illustrates an exemplary magnetic recording medium 700. Magnetic recording medium 700 includes: a base structure 702 with a surface 703 that includes an inert gas plasma-polish residue; an SUL 704 on the surface 703 of the base structure 702; and at least one magnetic recording layer 706 on (or over) the SUL 704. The entire top surface 703 of the base structure 702 upon which the SUL 704 is formed or provided may have the inert gas plasma-polish residue. The base structure 702 may be, for example, a substrate or a substrate with a pre-seed layer on the substrate. If the base structure 702 is just a substrate, the surface 703 that includes the inert gas plasma-polish residue may be the surface of the substrate upon which the SUL is formed or provided. If the base structure 702 is a substrate with a pre-seed layer formed thereon, the surface 703 that includes the inert gas plasma-polish residue may be the surface of the pre-seed layer upon which the SUL is formed or provided. Additional layers or coatings may be provided, such as one or more intermediate layers between the SUL 704 and the at least one magnetic recording layer 706, or one or more capping or lubricant layers above the at least magnetic recording layer 706. A magnetic recording layer structure may be formed that includes a plurality of the magnetic recording layers (or sub-layers) 706 and non-magnetic exchange control layers (not shown). See, above, for exemplary component materials or constituents of the various layers.

Note that some of the atoms and ions of the inert gas used in the plasma-polish process will be implanted or embedded into the base structure (which can either be the substrate or substrate/pre-seed layer) during the plasma-polish process. In this regard, a typical substrate (i.e., one that has not been plasma-polished with an inert gas) does not have any inert gas residue in it. If there is inert gas residue embedded in the (non-plasma polished) substrate due to (and/or during) the deposition of the first layer on the substrate (e.g., a pre-seed layer), the inert gas residue will be minimum or negligible in amount and concentration and in penetration depth. For the case where a pre-seed layer is provided, the pre-seed layer can be sputter-deposited onto the substrate in an inert gas environment (where, for sputter-deposition, the inert gas is usually argon). During sputter-deposition with argon, there can be some level of argon embedment in the pre-seed layer film. The plasma-polish described herein primarily uses krypton rather than argon (although in some examples other suitable inert gases, such as argon, xenon, or neon, may be used). Herein, the term plasma-polish residue refers to the residue from plasma polishing, which may differ from residue left by other processes. Likewise, herein, the term plasma-polish inert gas refers to the inert gas used for plasma polishing (e.g., krypton), which can differ from the inert gas used for other processes such as sputter-deposition (e.g., argon).

With the foregoing in mind, note that the amount or concentration of the inert gas residue of the particular type (e.g., krypton) used in the plasma-polish process is greater in the plasma-polished base structure than the amount of residue that might be present in a substrate or pre-seed layer that has not been plasma-polished using that same inert gas (e.g., krypton). Moreover, the depth to which the plasma-polishing inert gas residue (e.g., krypton) penetrates into the base structure may be greater than the depth of the same inert gas residue (e.g., krypton) that might be present in a substrate or pre-seed layer that has not been plasma-polished using that inert gas (e.g., krypton).

Since the SUL is amorphous, there is no epitaxial growth between the SUL and the base structure. In addition, the inert gas does not react chemically with other materials. As a result, the existence of the inert gas residue is not expected to affect the property of the SUL or the layers on top of it. This is a design consideration as to why the plasma-polish is selected to be performed on the base structure. The inventor has observed no negative impact with the embedment of the plasma-polishing inert gas residue. At minimum, the embedment of the plasma-polishing inert gas residue does not cancel out the benefits of plasma-polishing and the recording performance of the magnetic recording medium can be improved with the plasma-polish on the base structure.

Figure 9:
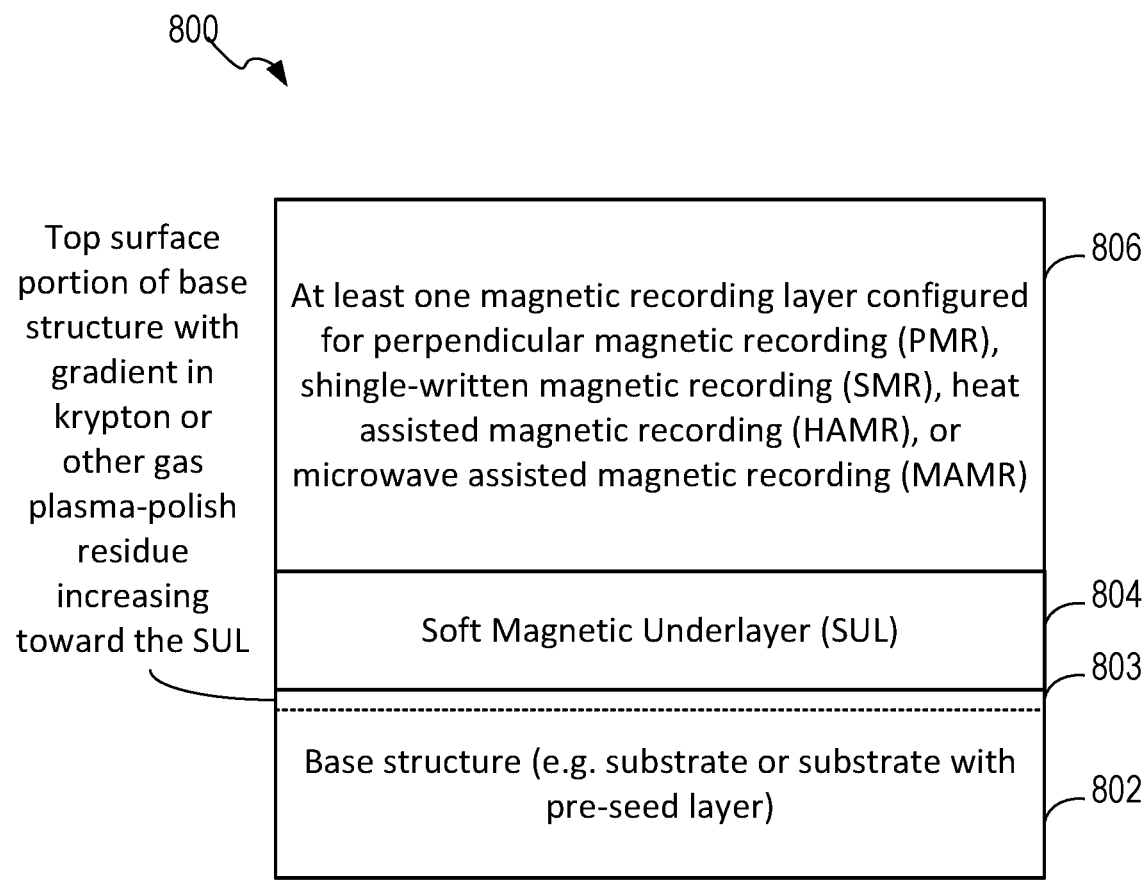
FIG. 9 is a side cross sectional view of a magnetic recording medium having an SUL formed on a base structure (e.g. a substrate or substrate and pre-seed layer), wherein a top surface portion of the base structure adjacent the SUL includes a krypton gas plasma-polish residue with a gradient in krypton residue increasing toward the SUL in accordance with an embodiment of the disclosure.

FIG. 9 illustrates an exemplary magnetic recording medium 800. Magnetic recording medium 800 includes: a base structure 802 (e.g. substrate or substrate with pre-seed layer) with a top surface portion 803 that includes a krypton gas plasma-polish residue (or other inert gas residue) that exhibits a gradient in the percentage of embedded krypton gas atoms (or other inert gas residue), with the percentage decreasing with increasing distance downward from the top surface into the base structure 802; an SUL 804 on the surface 803 of the base structure 802; and at least one magnetic recording layer 806 on (or over) the SUL 804 where the at least one magnetic recording layer is configured for PMR, SMR, HAMR, or MAMR. The entire top surface 803 of the base structure 802 upon which the SUL 804 is formed or provided may have the inert gas plasma-polish residue. The base structure 802 may be, e.g., a substrate or a substrate with a pre-seed layer on the substrate. If the base structure 802 is just a substrate, the surface 803 that includes the inert gas plasma-polish residue may be the surface of the substrate upon which the SUL is formed or provided. If the base structure 802 is a substrate with a pre-seed layer formed thereon, the surface 803 that includes the inert gas plasma-polish residue may be the surface of the pre-seed layer upon which the SUL is formed or provided. Additional layers or coatings may be provided, such as one or more intermediate layers between the SUL 804 and the at least one magnetic recording layer 806, or one or more capping or lubricant layers above the at least magnetic recording layer 806. A magnetic recording layer structure may be formed that includes a plurality of the magnetic recording layers 806 and non-magnetic exchange control layers (not shown). See, above, for exemplary component materials or constituents of the various layers.

Figure 10:
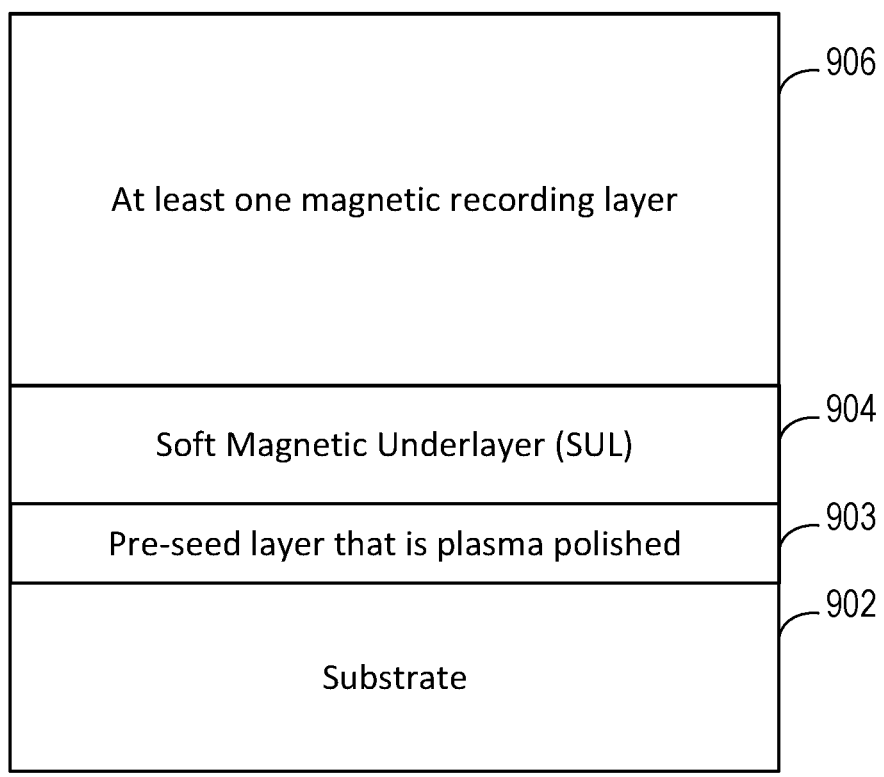
FIG. 10 is a side cross sectional view of a magnetic recording medium having an SUL on a plasma-polished pre-seed layer on a substrate in accordance with an embodiment of the disclosure.

FIG. 10 illustrates another exemplary magnetic recording medium 900. Magnetic recording medium 900 includes: a substrate 902; a pre-seed layer 903 that is plasma polished; an SUL 904 formed on the plasma-polished pre-seed layer 903; and at least one magnetic recording layer 906 formed on (or over) the SUL 904. The entire pre-seed layer 903 upon which the SUL 904 is formed or provided may be plasma-polished. Additional layers or coatings may be provided, such as one or more intermediate layers between the SUL 904 and the at least one magnetic recording layer 906, or one or more capping or lubricant layers above the magnetic recording layer 906. A magnetic recording layer structure may be provided that includes a plurality of magnetic recording layers or sublayers 906 and non-magnetic exchange control layers (not shown). See, above, for exemplary component materials or constituents of the various layers.

Figure 11:
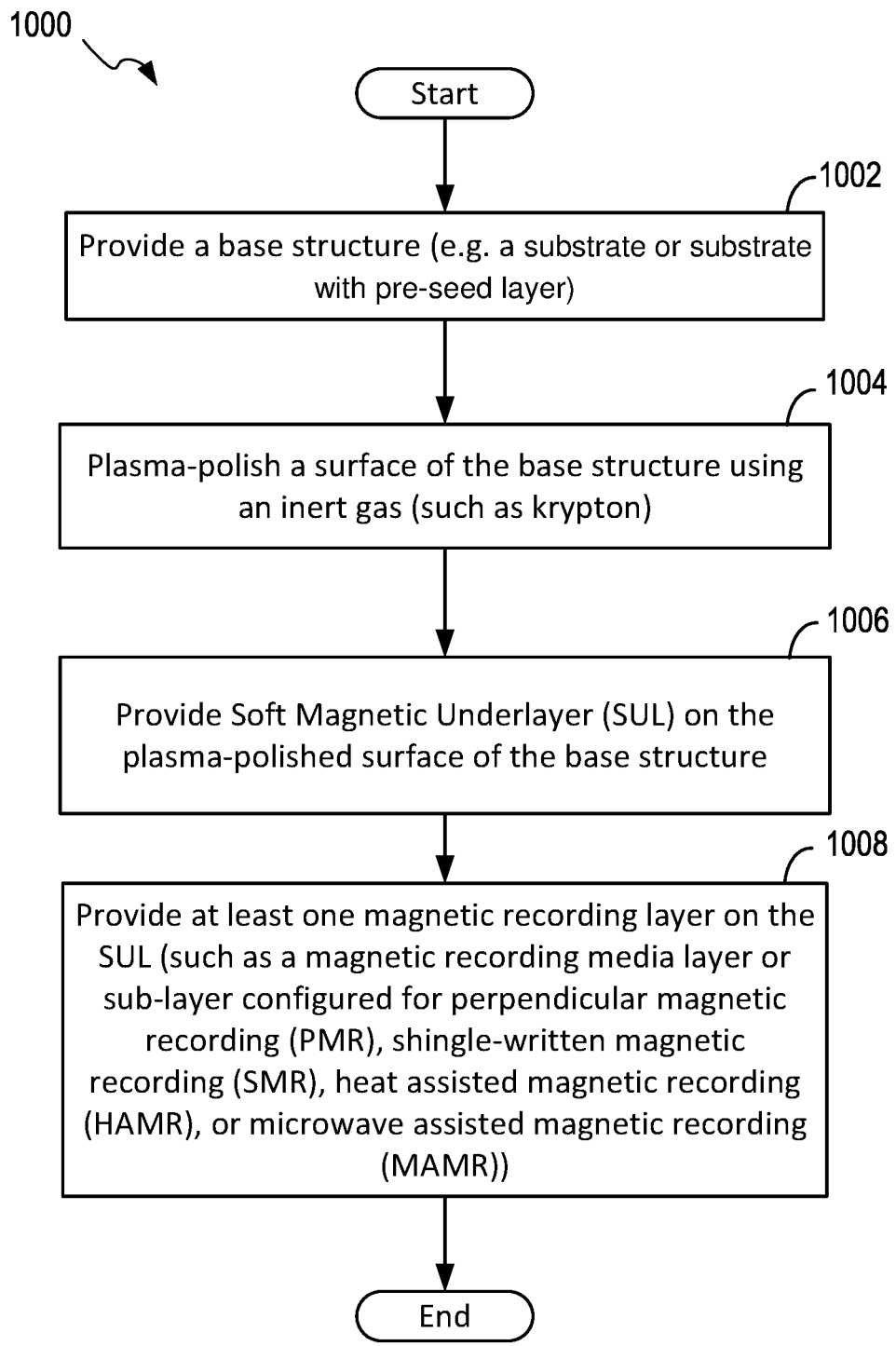
FIG. 11 is a flowchart of a process for fabricating a magnetic recording medium by plasma-polishing a base structure (e.g. a substrate or substrate and pre-seed layer) before forming an SUL over the base structure in accordance with an embodiment of the disclosure.

FIG. 11 summarizes an exemplary method 1000 for forming a magnetic recording medium. Briefly, at 1002, a base structure (e.g. a substrate or substrate with pre-seed layer) is provided. At 1004, a polishing apparatus is used to plasma-polish a surface of the base structure using an inert gas (such as krypton). At 1006, a deposition apparatus is used to form or provide an SUL on the plasma-polished surface of the base structure. At 1008, the deposition apparatus is used to form or provide at least one magnetic recording layer on the SUL (such as a media layer configured for PMR, SMR, HAMR, or MAMR).

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording medium, comprising:
a base structure comprising a surface portion that includes an embedded inert gas plasma-polish residue comprising a gradient in concentration that decreases inward from a surface of the surface portion;
a soft magnetic underlayer (SUL) on the surface of the base structure; and
at least one magnetic recording layer on the SUL.

2. The magnetic recording medium of claim 1, wherein the base structure comprises a substrate, and wherein the substrate comprises the surface portion that includes the inert gas plasma-polish residue.

3. A magnetic recording medium, comprising:
a base structure comprising a surface that includes an inert gas plasma-polish residue;
a soft magnetic underlayer (SUL) on the surface of the base structure; and
at least one magnetic recording layer on the SUL,
wherein the base structure comprises a substrate and a pre-seed layer on the substrate, and wherein the pre-seed layer comprises the surface that includes the inert gas plasma-polish residue.

4. The magnetic recording medium of claim 3, wherein the substrate is made of a non-conductive material.

5. The magnetic recording medium of claim 3, wherein the pre-seed layer comprises a metal.

6. A magnetic recording medium, comprising:
a base structure comprising a surface that includes an inert gas plasma-polish residue;
a soft magnetic underlayer (SUL) on the surface of the base structure;
at least one magnetic recording layer on the SUL; and
a seed layer on the SUL, an interlayer on the seed layer, and an underlayer between the interlayer and the at least one magnetic recording layer.

7. The magnetic recording medium of claim 1, wherein the inert gas plasma-polish residue comprises a residue selected from a group consisting of krypton, argon, xenon, neon, and combinations thereof.

8. The magnetic recording medium of claim 1, wherein the SUL comprises a material selected from the group consisting of cobalt, iron, molybdenum, tantalum, niobium, boron, chromium, and combinations thereof.

9. A magnetic recording medium, comprising:
a base structure comprising a surface that includes an inert gas plasma-polish residue;
a soft magnetic underlayer (SUL) on the surface of the base structure; and
at least one magnetic recording layer on the SUL,
wherein an arithmetic average roughness of the surface of the base structure is less than 3.0 angstroms (Å).

10. The magnetic recording medium of claim 1,
wherein the base structure comprises a substrate and a pre-seed layer,
wherein the substrate is made of a glass or ceramic material,
wherein the pre-seed layer comprises a metal,
wherein the inert gas plasma-polishing residue comprises a residue selected from a group consisting of krypton, argon, xenon, neon, and combinations thereof, and
wherein the SUL comprises a material selected from the group consisting of cobalt, iron, molybdenum, tantalum, niobium, boron, chromium, and combinations thereof.

11. The magnetic recording medium of claim 1, wherein the SUL is configured to provide a return path for a magnetic field applied to the magnetic recording medium during a write operation.

12. A magnetic recording device, comprising:
the magnetic recording medium of claim 1; and
a recording head configured to write information to the magnetic recording medium.

13. A method for fabricating a magnetic recording medium, comprising:
providing a base structure;
plasma-polishing a surface portion of the base structure using an inert gas, such that a residue of the inert gas is embedded in the surface portion and comprises a gradient in concentration that decreases inward from a surface of the surface portion;
providing a soft magnetic underlayer (SUL) on the plasma-polished surface of the base structure; and
providing at least one magnetic recording layer on the SUL.

14. The method of claim 13:
wherein the base structure comprises a substrate; and
wherein the plasma-polishing of the surface portion of the base structure using the inert gas comprises plasma-polishing a surface of the substrate.

15. A method for fabricating a magnetic recording medium, comprising:
providing a base structure;
plasma-polishing a surface of the base structure using an inert gas;
providing a soft magnetic underlayer (SUL) on the plasma-polished surface of the base structure; and
providing at least one magnetic recording layer on the SUL,
wherein the base structure comprises a substrate and a pre-seed layer, and
wherein the plasma-polishing of the surface of the base structure using the inert gas comprises plasma-polishing a surface of the pre-seed layer.

16. The method of claim 15, wherein the substrate is made of a non-conductive material.

17. The method of claim 15, wherein the pre-seed layer comprises a metal.

18. The method of claim 13, wherein the surface portion is plasma-polished with an inert gas selected from a group consisting of krypton, argon, xenon, neon, and combinations thereof.

19. The method of claim 13, wherein the surface of the base structure is plasma-polished to achieve a roughness less than an arithmetic average roughness threshold of 3.0 angstroms (Å).

20. The method of claim 13, wherein the SUL comprises a material selected from the group consisting of cobalt, iron, molybdenum, tantalum, niobium, boron, chromium, and combinations thereof.

21. The method of claim 13, wherein the SUL is configured to provide a return path for a magnetic field applied to the magnetic recording medium during a write operation.

22. A magnetic recording medium, comprising:
a substrate;
a pre-seed layer on the substrate, wherein the pre-seed layer is plasma-polished and includes an inert gas plasma-polishing residue comprising a residue selected from a group consisting of krypton, argon, xenon, neon, and combinations thereof;

a soft magnetic underlayer (SUL) on the plasma-polished pre-seed layer; and at least one magnetic recording layer on the SUL.

23. The magnetic recording medium of claim 22, wherein an arithmetic average roughness of a surface of the pre-seed layer is less than 3.0 angstroms (Å).

24. A magnetic recording device, comprising:

the magnetic recording medium of claim 22; and a recording head configured to write information to the magnetic recording medium.

* * * * *